(12) United States Patent
Habel (10) Patent No.: US 9,503,187 B2
(45) Date of Patent: Nov. 22, 2016

(54) APPARATUS AND METHOD FOR RETRIEVING DATA FROM A WDM SIGNAL, TRANSMITTER AND METHOD FOR TRANSMITTING A WDM SIGNAL, AND WDM SYSTEM

(71) Applicant: Fraunhofer-Gesellschaft zur Foerderung der angewandten Forschung e.V., Munich (DE)

(72) Inventor: Kai Habel, Guestrow (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 14/690,246

(22) Filed: Apr. 17, 2015

(65) Prior Publication Data

US 2015/0222357 A1 Aug. 6, 2015

Related U.S. Application Data

(63) Continuation of application No. PCT/EP2012/070774, filed on Oct. 19, 2012.

(51) Int. Cl.
*H04B 10/08* (2006.01)
*H04B 10/2507* (2013.01)
(Continued)

(52) U.S. Cl.
CPC ........ *H04B 10/2507* (2013.01); *H04B 10/506* (2013.01); *H04J 14/02* (2013.01); *H04J 14/0227* (2013.01)

(58) Field of Classification Search
CPC ............ H04B 10/506; H04B 10/0793; H04B 10/2563; H04B 10/079; H04B 10/697; H04B 10/2507; H04B 10/2543; H04B 2210/252; H04B 10/254; H04B 10/0795; H04B 3/32; H04B 3/487; H04J 14/02; H04J 14/0227; H04J 14/0271; H04J 3/10; H04L 25/0202; H04M 3/34
USPC ......... 398/25, 26, 27, 28, 79, 68, 90, 91, 34
See application file for complete search history.

(56) References Cited

U.S. PATENT DOCUMENTS

| | | | | |
|---|---|---|---|---|
| 5,086,423 A | * | 2/1992 | Streit | H04J 3/10 370/201 |
| 6,647,067 B1 | * | 11/2003 | Hjelm | H04B 3/487 370/201 |

(Continued)

FOREIGN PATENT DOCUMENTS

| | | |
|---|---|---|
| JP | 2008079131 A | 4/2008 |
| JP | 2012044626 A | 3/2012 |
| WO | 2010072413 A1 | 7/2010 |

OTHER PUBLICATIONS

Li, Youming et al.; "Computationally Efficient Approximated Matrix Inversion with Application to Crosstalk Precoding in Downstream VDSL"; In the proceedings of IWCM '07, Honolulu, HI, USA; Aug. 12-16, 2007; pp. 429-433.

(Continued)

*Primary Examiner* — Hibret Woldekidan
(74) *Attorney, Agent, or Firm* — Michael A. Glenn; Perkins Coie LLP (57) ABSTRACT

An apparatus for retrieving data from an optical wavelength-division multiplexing (WDM) signal received via a WDM path in a wavelength-division multiplexing transmission system having a plurality of channels associated with different wavelengths includes a demultiplexer configured to split the optical WDM signal into a plurality of signals each associated with one of the channels, and a calculator configured to calculate data associated with a respective one of the channels based on the signal associated with the respective channel and taking information on determined crosstalk interferences of other channels to the respective channel into consideration. A transmitter for transmitting an optical WDM signal via a WDM path in a WDM transmission system having a plurality of channels associated with different wavelengths includes a predistorter configured to predistort data associated with a respective one of the channels by information on determined crosstalk interferences of other channels to the respective channel, and a signal source.

9 Claims, 8 Drawing Sheets

(51) Int. Cl.
*H04J 14/02* (2006.01)
*H04B 10/50* (2013.01)

(56) References Cited

U.S. PATENT DOCUMENTS

| | | | | |
|---|---|---|---|---|
| 7,394,752 | B2* | 7/2008 | Hasegawa | H04B 3/32 370/201 |
| 8,605,567 | B2* | 12/2013 | Wilkes | H04L 12/2892 370/201 |
| 8,670,667 | B1* | 3/2014 | Sandstrom | H04J 14/0239 370/352 |
| 9,094,097 | B2* | 7/2015 | Nuzman | H04B 3/32 |
| 9,236,943 | B2* | 1/2016 | Ma | H04B 10/071 |
| 9,379,770 | B2* | 6/2016 | Nuzman | H04B 3/32 |
| 2003/0235145 | A1* | 12/2003 | Shanbhag | H04J 14/02 370/201 |
| 2004/0197103 | A1* | 10/2004 | Roberts | H04B 10/2543 398/159 |
| 2009/0060067 | A1 | 3/2009 | Guenach et al. | |
| 2013/0215951 | A1* | 8/2013 | Nuzman | H04B 3/32 375/227 |
| 2013/0328706 | A1* | 12/2013 | Marom | H03M 1/1245 341/137 |
| 2015/0295621 | A1* | 10/2015 | Wang | H04B 3/32 370/201 |

OTHER PUBLICATIONS

Freund, Ronald; "High-speed Transmission in Multimode Fibers"; OFC/NFOEC, Tutorial OMS1; San Diego, CA, USA; Mar. 2009, 63 pages.
ITU-T G.9963 "Series G: Transmission Systems and Media, Digital Systems and Networks, Access networks, In premises networks; Unified high-speed wireline-based home networking transceivers—Multiple input/multiple output specification", International Telecommunication Union, ITU-T, Telecommunication Standardization Sector of ITU, Dec. 2011, pp. 1-81.
Chandarasekhar, S. et al., "WDM/SDM Transmission of 10 x 128-Gb/s PDM-QPSK over 2688-km 7-Core Fiber with a per-Fiber Net Aggregate Spectral-Efficiency Distance Product of 40,320 km•b/s/Hz", ECOC Postdeadline Papers (2011): pp. 1-3.
Idler, W. et al., "WDM Field Trial over 764 km SSMF with 16 x 112 Gb/s NRZ-DQPSK co-propagating with 10.7 Gb/s NRZ", Proc. ECOC, Sep. 19-23, 2010, 3 pages.
IEEE Standard for Information technology—Telecommunications and information exchange between systems—Local and metropolitan area networks—Specific requirements, "Part 3: Carrier Sense Multiple Access with Collision Detection (CSMA/CD) access method and Physical Layer specifications", IEEE Std. 802.3, 2008, pp. 1-315.
ITU-T G.671, "Series G: Transmission Systems and Media, Digital Systems and Networks, Transmission media and optical systems characteristics—Characteristics of optical components and subsystems, Transmission characteristics of optical components and subsystems", International Telecommunication Union, ITU-T, Telecommunication Standardization Sector of ITU, Jan. 2009, pp. 1-36.
ITU-T G.694.2, "Series G: Transmission Systems and Media, Digital Systems and Networks, Transmission media characteristics—Characteristics of optical components and subsystems, Spectral grids for WDM applications: CWDM wavelength grid", International Telecommunication Union, ITU-T, Telecommunication Standardization Sector of ITU, Dec. 2003, 12 pages.
Koebele, C. et al., "40 km Transmission of Five Mode Division Multiplexed Data Streams at 100Gb/s with low MIMO-DSP Complexity", European Conference and Exposition on Optical Communications, Optical Society of America, 2011, pp. 1-3.
Sakamoto, T. et al., "Differential Mode Delay Managed Transmission Line for WDM-MIMO System Using Multi-Step Index Fiber", Journal of Lightwave Technology, vol. 30, No. 17, Sep. 1, 2012, pp. 2783-2787.

* cited by examiner

APPARATUS AND METHOD FOR RETRIEVING DATA FROM A WDM SIGNAL, TRANSMITTER AND METHOD FOR TRANSMITTING A WDM SIGNAL, AND WDM SYSTEM

CROSS-REFERENCE TO RELATED APPLICATIONS

This application is a continuation of copending International Application No. PCT/EP2012/070774, filed Oct. 19, 2012, which is incorporated herein in its entirety by this reference thereto.

The present invention relates to the field of wavelength-division multiplexing (WDM) transmission systems and, in particular, an apparatus for retrieving data from a WDM signal received via a WDM path in a WDM transmission system, a transmitter for transmitting an optical WDM signal via a WDM path in a WDM transmission system, and corresponding methods and systems.

BACKGROUND OF THE INVENTION

Wavelength-division multiplexing is a technology which multiplexes a number of optical carrier signals onto a single optical path, such as a single optical fiber, by using different wavelengths. The optical carrier signals having different wavelengths are commonly referred to as channels. This technique enables bidirectional communications over an optical path. Generally, in WDM transmission systems it is important that the spectrum of the transmission source at the transmitter side and filter properties of wavelength selective elements at the receiver side are adjusted to each other. In particular, neighboring channels have to be prevented from excessively interfering with each other by crosstalk.

Optical bandpass filters may prevent or minimize interferences by neighboring WDM channels. The characteristics of these filters with respect to the center frequency bandwidth and further parameters may be defined exactly and may be adapted to the spectrum to be transmitted. In this regard, reference is made to Idler, et al.: "WDM Field Trial over 764 km SSMF with 16×112 Gb/s NRZ-DQPSK co-propagating with 10.7 Gb/s NRZ", ECOC 2010, 19-23 Sep. 2010, Torino, Italy, We.8.C.5. Furthermore, it is important to prevent a mismatch between the spectrum of the signal source and the filter characteristics due to environmental conditions, such as thermal influences. To this end, temperature stabilization or a wide filter passband, such as coarse wavelength division multiplexing (CWDM), have been proposed, see ITU-T G.694.2 Spectral grids for WDM applications: CWDM wavelength grid, 12/2003 and ITU-T G.671 Transmission characteristics of optical components and subsystems, 01/2009.

On the other hand, in the field of wired electrical communication systems, compensation by means of digital signal processing is commonly used and investigated intensively. Examples are a parallel data transmission of four data streams in gigabit ethernet systems, see IEEE Std. 802.3 Local and metropolitan area networks—Specific requirements Part 3: Carrier sense multiple access with collision detection (CSMA/CD) access method and physical layer specifications, Clause 40, 2005, or the parallel data transmission of two data streams in power line communication (PLC) systems, see ITU-T, "G.9963: Unified high-speed wireline-based home networking transceivers—Multiple input/multiple output specification", 12/2011.

In optical systems, crosstalk compensation for space division multiplexing (SDM) systems was tested, see S. Chandarasekhar et al., "WDM/SDM Transmission of 10×128—Gb/s PDM—QPSK over 2688-km 7—Core Fiber with a per-Fiber Net Aggregate Spectral Efficiency Distance Product of 40,320 km. b/s/Hz", ECOC Post-deadline Papers, 2011 OSA]. Such compensation was suggested under the key word MIMO-SDM, see C. Koebele, M. Salsi, L. Milord, R. Ryf, C. Bolle, P. Sillard, S. Bigo, and G. Charlet, 840 km transmission of five mode division multiplexed data streams at 100 Gb/s with low MIMO-DSP complexity, in Proc. ECOC, Geneva, Switherland, 2011, Paper Th. 13.C3.

Taiji Sakamoto, et al.: "Differential Mode Delay Managed Transmission Line for WDM-MIMO System Using Multi-Step Index Fiber", JLT, Vol. 30, NO. 7, Sep. 1, 2012, use the term WDM-MIMO (Wavelength-Division Multiplexing Multiple Input Multiple Output) in the context of a system consisting of fibers with positive and negative differential mode delays to compensate for the total differential mode delay.

SUMMARY

According to an embodiment, an apparatus for retrieving data from an optical wavelength-division multiplexing (WDM) signal received via a WDM path in a WDM transmission system having a plurality of channels associated with different wavelengths may have: a demultiplexer configured to split the optical WDM signal into a plurality of signals each associated with one of the channels; a calculator configured to calculate data associated with a respective one of the channels based on the signal associated with the respective channel and taking information on determined crosstalk interferences of other channels to the respective channel into consideration.

According to another embodiment, a transmitter for transmitting an optical wavelength-division multiplexing signal via a WDM path in a WDM transmission system having a plurality of channels associated with different wavelengths may have: a predistorter configured to predistort data associated with a respective one of the channels by information on determined crosstalk interferences of other channels to the respective channel; and a signal source for each channel of the WDM transmission system configured to convert the data associated with the respective channel into an optical signal having a carrier frequency corresponding to the wavelength of the respective channel and to apply the optical signal to the WDM path.

According to another embodiment, a wavelength-division multiplexing system may have an apparatus according to claim 1, a transmitter and a WDM path coupling the transmitter and the apparatus.

According to another embodiment, a wavelength-division multiplexing system may have a transmitter according to claim 7, a WDM path and a receiver configured to receive WDM signals from the transmitter through the WDM path, wherein the receiver includes a channel estimator configured to determine information on crosstalk interferences between the channels based on predetermined and distinguishable sequences of symbols and wherein the receiver is configured to send the determined information on crosstalk interferences to the transmitter.

According to another embodiment, a method for retrieving data from an optical wavelength-division multiplexing signal received via a WDM path in a wavelength-division multiplexing transmission system having a plurality of channels associated with different wavelengths splitting the optical WDM signal into a plurality of signals each associated with one of the channels; calculating data associated with a respective one of the channels based on the signal associated with the respective channel and taking information on determined crosstalk interferences of other channels to the respective channel into consideration.

According to another embodiment, a method for transmitting an optical wavelength-division multiplexing signal via a WDM path in a WDM transmission system having a plurality of channels associated with different wavelengths may have the steps of: predistorting data associated with a respective one of the channels by information on determined crosstalk interferences of other channels to the respective channel; for each channel of the WDM transmission system, converting the data associated with the respective channel into an optical signal having a carrier frequency corresponding to the wavelength of the respective channel; and transmitting the optical signals through the WDM path.

According to another embodiment, a computer program may have a program code for performing a method according to claim 11 when the computer program runs on a computer.

According to another embodiment, a computer program may have a program code for performing a method according to claim 12 when the computer program runs on a computer.

Embodiments of the invention are based on the recognition that reliability of data transmission through WDM transmission systems may be improved by applying the principles of crosstalk compensation to optical transmission systems in order to suppress or reduce interferences by other, such as neighboring, WDM channels. In embodiments of the invention, interference by other or neighboring WDM channels is suppressed or reduced by digital signal processing.

In embodiments of the invention, the calculator is configured to take information on an identified crosstalk of only two direct neighbor channels of the respective channels into consideration. Thus, specific properties of WDM crosstalk are utilized in order to compensate for or reduce disturbances caused by such crosstalk in a beneficial manner. In embodiments of the invention, the calculator is configured to multiply a receipt vector by the inverse of a crosstalk matrix, wherein each element of the receipt vector includes the digital signal associated with one of the channels and wherein the crosstalk matrix identifies crosstalk interferences between the channels in the WDM transmission system. Taking only two direct neighbor channels of the respective channel into consideration allows the crosstalk matrix to be a tridiagonal symmetric crosstalk matrix such that the complexity of the calculation that may be used may be reduced.

In embodiments of the invention, the apparatus comprises a channel estimator configured to determine the information on crosstalk interferences between the channels based on predetermined and distinguishable sequences of symbols and to dynamically update the information on the identified crosstalk interferences. Thus, interferences due to crosstalk can be reliably suppressed even in case of changing conditions.

Thus, in embodiments of the invention, compensation of interferences due to crosstalk is achieved by predistortion at the transmitter side, rather than by corresponding calculations at the receiver side. Embodiments of the invention provide for a WDM system comprising such a transmitter, a WDM path and a receiver configured to receive WDM signals from the transmitter through the WDM path, wherein the receiver comprises a channel estimator configured to determine information on crosstalk interferences between the channels based on predetermined and distinguishable sequences of symbols and wherein the receiver is configured to send the determined crosstalk interferences to the transmitter. Thus, the transmitter is in a position to predistort the data to be transmitted such that interferences expected at the receiver side in the absence of a predistortion are compensated for or at least reduced.

Embodiments of the invention provide for corresponding methods for retrieving data from a WDM signal and for transmitting an optical WDM signal via a WDM path. Further embodiments provide for a computer program comprising program codes for performing such methods.

Embodiments of the invention permit the usage of signal sources having overlapping spectra. Accordingly, expansive selection of signal sources is no longer necessary. In addition, it is no longer necessary to tune or to finely tune the center frequencies of the filters and the signal sources to each other. Accordingly, embodiments of the invention permit a reliable transmission of data through a WDM transmission system with reduced requirements to the hardware of the system.

Embodiments of the invention may be applied to optical transmission systems with several wavelength channels, so-called wavelength-division multiplexing systems (WDM systems) and spectral overlapping signal sources. For example, the invention may be applied to wireless optical transmissions systems having several parallel data streams and LED sources (light emitting diodes) or other modulatable light sources, wherein optical color filters are provided for each receiver. Embodiments of the invention may be applied to polymer optical fiber based WDM systems having several parallel data streams, LED sources or other modulatable light sources and optical color filters in front of each receiver. Embodiments of the invention may be applied to fiberglass based transmission systems with Fabry-Perot lasers or other modulatable light sources and wavelength selective filters at the receiver side.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
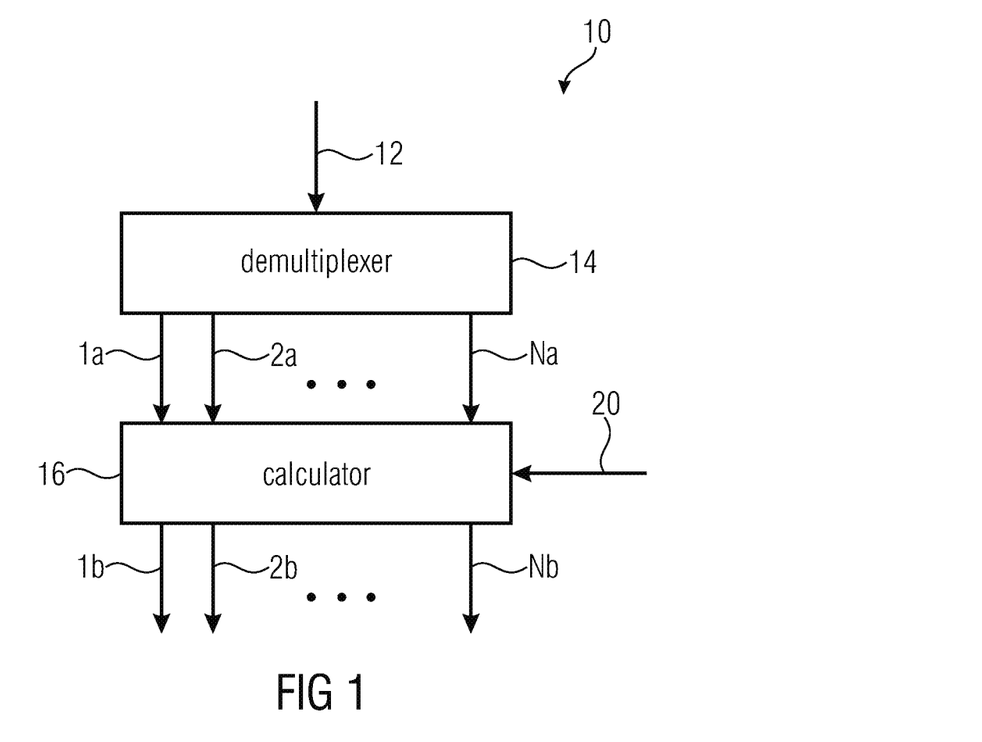
FIG. 1 shows schematically an embodiment of an apparatus for retrieving data from an optical WDM signal.

FIG. 1 shows an apparatus 10 for retrieving data from an optical WDM signal 12. Apparatus 10 comprises a demultiplexer 14 and a calculator 16. Demultiplexer 14 may comprise a plurality of optical receivers and a wavelength selective element arranged in front of each optical receiver. Thus, the demultiplexer 14 splits the optical WDM signal 12 into a plurality of signals 1a, 2a, . . . , Na corresponding to channels of a WDM system. In addition to splitting the optical WDM signal into a plurality of signals each associated with one of the channels of the WDM system, the demultiplexer converts the plurality of signals into electrical signals, such as by means of corresponding optical receivers, such as photo diodes or the like.

The calculator receives the plurality of signals $1a$, $2a$, ..., $Na$ and calculates data $1b$, $2b$, ..., $Nb$ associated with the respective channel taking information 20 on determined crosstalk interferences of other channels to the respective channel into consideration.

In embodiments of the invention, information 20 may be constant information, which are determined during build-up of the system one time. To be more specific, crosstalk from each channel to each other channel may be determined only one time and may be stored to be available to the receiver, i.e. the apparatus for retrieving data from a WDM signal, for the subsequent signal processing. Such an approach may be practical in case the conditions, such as the intensities of the interferences, do not change during the operation of the system.

In other embodiments of the invention, the information is continuously measured and stored during the operation of the system. For example, a channel estimator may be provided to determine for each WDM channel at the receiver side the crosstalk interference by means of channel estimation. To this end, predetermined (known) and distinguishable sequences of symbols may be transmitted for each channel from a transmitter to the receiver. Distinguishability of the sequences of symbols may be achieved by means of time multiplex or or by means of mathematical orthogonality. Thus, each receiver may detect the intensity of the actual channel signal and the intensity of crosstalk interferences by the neighboring WDM channels. Thus, in embodiments of the invention, information on crosstalk interferences is determined in a dynamical manner.

In embodiments, a crosstalk matrix C is determined from the detected crosstalk interferences and stored for the subsequent signal processing. Thus, information 20 may be in the form of the crosstalk matrix C.

Generally, calculator 16 may be configured to suppress interferences to a channel by other channels by adding or subtracting corresponding portions of the signals on the other channels from the signal on the respective channel. If the crosstalk matrix C is known, interferences may be suppressed or reduced by a multiplication with the inverse of the crosstalk matrix.

To be more specific, a receipt vector $X(t)=[X_1(t)\ X_2(t)\ ...\ X_N(t)]$ for N (N being a natural number) parallel receipt streams (each associated with a channel) is multiplied with the inverse of crosstalk matrix C and the vector of undisturbed receipt signals $Y(t)=[Y_1(t)\ Y_2(t)\ ...\ Y_N(t)]$ results:

$$Y(t)=X(t)*C^{-1}.$$

In WDM systems, a channel is disturbing primarily the direct neighbors and, therefore, the crosstalk matrix C is occupied diagonally:

$$C = \begin{pmatrix} c_{11} & c_{12} & 0 & \cdots & 0 \\ c_{21} & c_{22} & c_{23} & \cdots & 0 \\ 0 & c_{32} & c_{33} & \cdots & 0 \\ \vdots & \vdots & \vdots & \ddots & \vdots \\ 0 & 0 & 0 & \cdots & c_{NN} \end{pmatrix}$$

In crosstalk matrix C, coefficients $c_{11}$ to $c_{NN}$ (arranged diagonally) represent the transmission coefficients for the respective channels 1 to N. Coefficient $c_{12}$ indicates the interference of the first channel to the second channel and coefficient $c_{21}$ indicates the interference of the second channel to the first channel, etc.

Utilizing the specific properties of the channel crosstalk of WDM channels, the matrix C may be a tridiagonal and symmetric ($c_{ij}=c_{ji}$) matrix. For such matrices, there are simple methods for matrix inversion and, therefore, the calculation may be achieved in an easy manner.

In case there are only symmetric interferences from both neighbor channels, the matrix will be tridiagonal and symmetric. In case the interferences from both neighbor channels are not symmetric, i.e. the interference of channel 2 by channel 1 is different from the interference of channel 1 by channel 2, the matrix will still be tridiagonal, but no longer symmetric. In case the next but one channels disturb as well, the matrix will be a banded matrix.

Thus, generally, the crosstalk matrix could include coefficients not only for direct neighbor channels. Thus, generally, by multiplying the receipt vector by the inverse of matrix C, interferences of all other channels to one channel can be suppressed.

Alternative to making use of a crosstalk matrix, another option of processing the signals associated with each channel would be to simply add or subtract the determined signal portions of the direct neighbor channels (which are caused by crosstalk) for each received channel $x_i(t)$.

Figure 2:
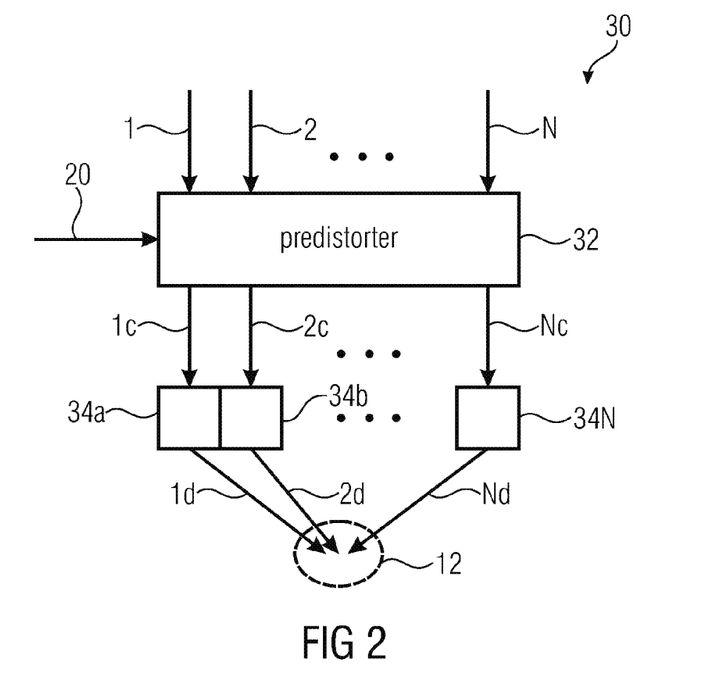
FIG. 2 shows schematically an embodiment of a transmitter for transmitting an optical WDM signal.

In other embodiments, the information on determined crosstalk interferences of other channels to the respective channel are sent from the receiver side to the transmitter side. An embodiment of a transmitter 30 is shown in FIG. 2. The transmitter 30 comprises a predistorter 32 and an optical signal source $34a$, $34b$, ..., $34n$ for each channel. The predistorter 32 receives the information 20 on determined crosstalk interferences and data 1, 2, ..., N for each channel. The predistorter 32 predistorts data 1, 2, ..., N utilizing the information 20. The predistorter outputs predistorted signals $1c$, $2c$, ..., Nc to the respective optical signal source $34a$, $34b$, ..., 34N. The optical signal sources convert the electrical predistorted signals $1c$, $2c$, ..., Nc into optical signals $1d$, $2d$, ..., Nd, which have a carrier frequency corresponding to the wavelength of the respective channel. The optical signals $1d$, $2d$, ..., Nd are then transmitted as WDM signal 12 via the WDM path.

The predistorter 32 predistorts the signals using the information 20 such that the interferences, which would otherwise be present at the receiver side are compensated for. Thus, in case of predistortion at the transmitter side, no further compensation has to be done at the receiver side.

In embodiments of the invention, in case of WDM systems having a dispersion which may not be neglected, the dispersion is also estimated and considered in calculating the data at the receiver side or sent to the transmitter so that the predistortion at the transmitter may also compensate for such dispersion. The dispersion may be estimated by measuring channel by a channel without crosstalk.

Figure 3:
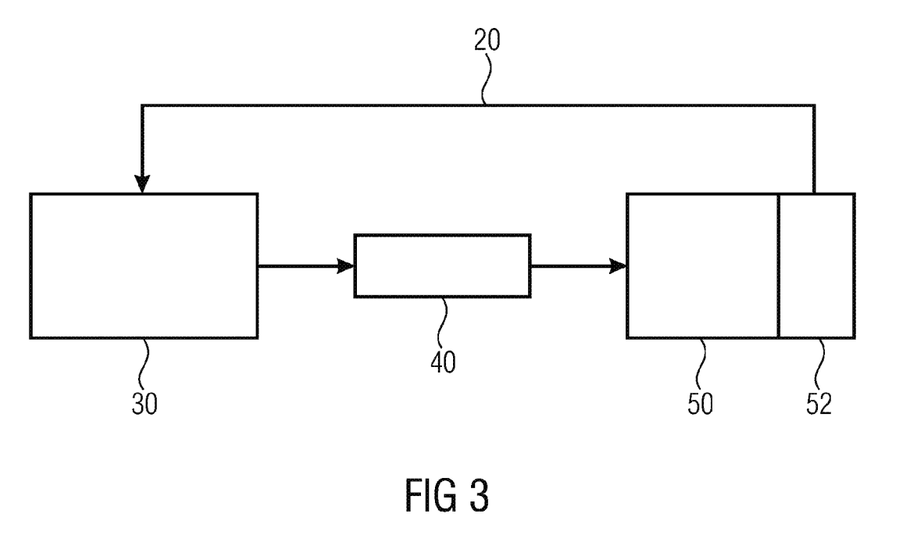
FIG. 3 shows schematically an embodiment of a WDM system.

FIG. 3 shows a schematic view of an embodiment of a WDM system making use of predistortion. The system comprises the transmitter 30, a WDM path 40 and a receiver 50. The receiver 50 comprises a channel estimator 52. The channel estimator determines the information 20 on crosstalk interferences and sends this information to the transmitter 30. The information 20 may be sent to the transmitter 30 by any suitable means, such as by means of a wireless radio transmission, by wired transmission or by an optical transmission through the WDM path or through a separate optical path.

Figure 4:
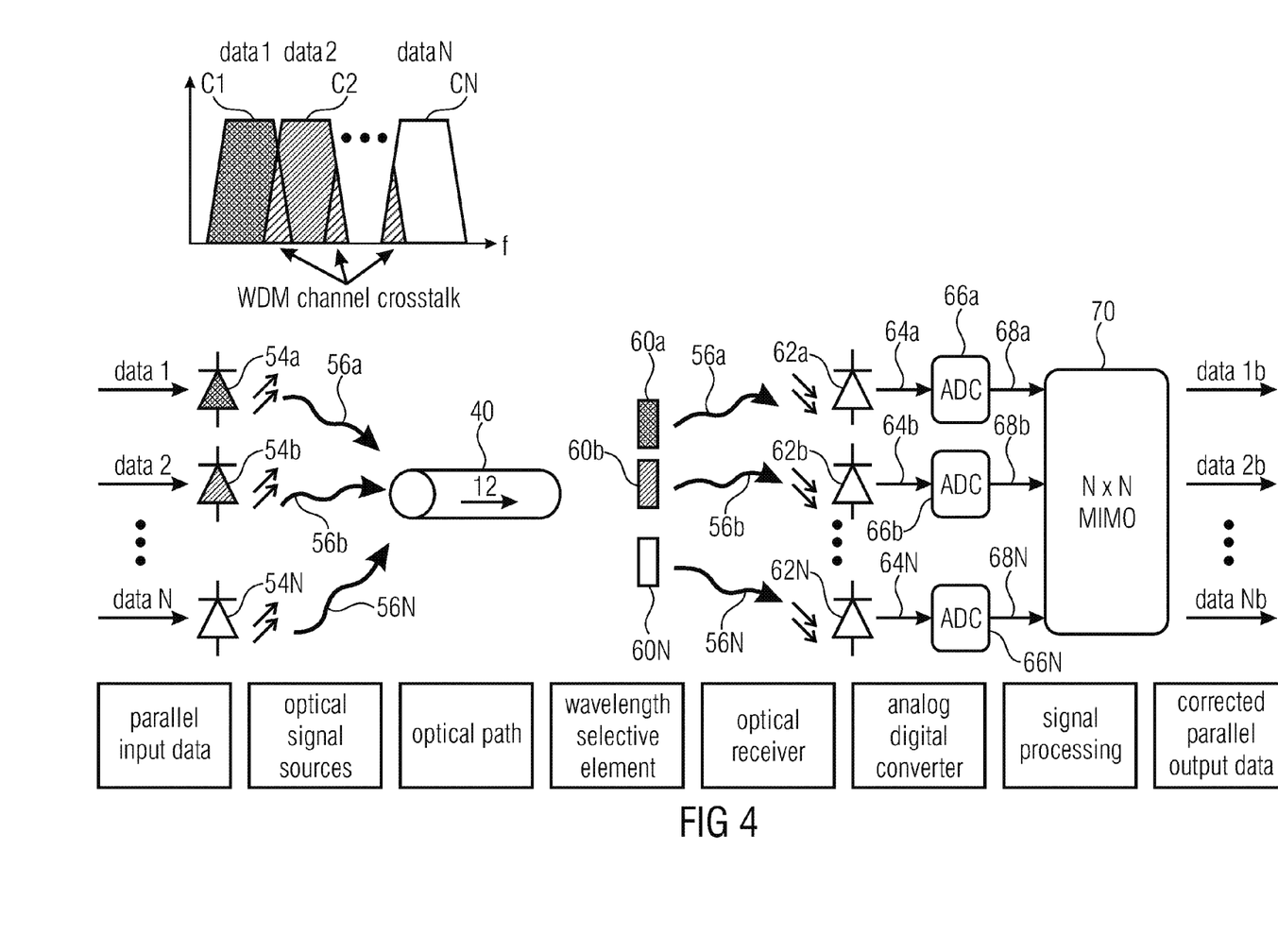
FIG. 4 shows a schematic representation of an embodiment of a WDM system.

An embodiment of a WDM system, in which compensation is achieved at the receiver side is now explained referring to FIG. 4.

In the upper portion of FIG. 4, overlapping spectra associated with channels C1, C2, . . . , CN are shown. Data 1, 2, . . . , N are associated with each channel C1, C2, . . . , CN. A frequency spectrum is associated with each channel and the channels overlap so that crosstalk takes place between WDM channels, as shown by hatched portions in the spectra in FIG. 4. Embodiments of the invention may be beneficially used along with such an optical transmission system with several parallel WDM channels and a noticeable WDM crosstalk which may not be neglected. As explained above, information on this crosstalk may be determined and stored in order to compensate for the crosstalk at the receiver side (or by predistortion at the transmitter side).

As shown in the lower portion of FIG. 4, parallel input data 1, 2, . . . , N, are applied to optical signal sources 54a, 54b, . . . , 54N. The signal sources may be formed by LEDs (light emitting diodes), SLEDs (superluminescent diodes) or lasers. Each signal source is associated with a channel C1, C2, . . . , CN and outputs an optical signal 56a, 56b, . . . , 56N comprising the associated carrier frequency. The optical signals 56a, 56b, . . . 56N are applied to an optical WDM path 40, such as a fiberglass, a polymer optical fiber or a wireless optical channel, as a WDM signal 12. Optical path 40 transmits the WDM signal 12, i.e. the optical signals 56a, 56b, . . . , 56N in parallel, to the receiver side.

At the receiver side, the optical signals are separated by means of wavelength selective elements 60a, 60b, . . . , 60N. The center frequencies of the wavelength selective elements 60a, 60b, . . . , 60N are matched to the center frequency of the spectrum of the associated channel. However, a fine-tuning of the respective center frequencies is not required in view of the signal processing performed according to embodiments of the invention. The wavelength selective elements may be formed by optical filters, arrayed waveguide gratings (AWGs) or the like. The separated optical signals 56a, 56b, . . . , 56N are applied to optical receivers 62a, 62b, . . . , 62N, which convert the optical signals into electrical signals 64a, 64b, . . . , 64N, which are analog signals. The optical receivers may be formed by photodiodes, such as PIN diodes or avalanche photo diodes. The electrical signals 64a, 64b, . . . , 64N are applied to analog digital converters 66a, 66b, . . . , 66N, where same are converted into digital electrical signals 68a, 68b, . . . , 68N. The digital signals 68a, 68b, . . . , 68N are applied to a signal processing unit 70. In the signal processing unit 70, the parallel signal streams are processed taking the information on the determined crosstalk inferences into consideration. For example, the processing unit uses the inverse of the determined crosstalk matrix to reproduce data 1b, 2b, . . . , Nb from digital signals 68a, 68b, . . . , 68N. Data 1b, 2b, . . . , Nb represent corrected parallel output data and, therefore, correspond to data 1, 2, . . . , N if correction was successful, i.e. if interferences caused by crosstalk have been suppressed.

Processing unit 70 may multiply the incoming receipt vector X(t) (represented by digital signals 68a, 68b, 68N) by the inverse of the crosstalk matrix C to achieve the corrected receipt signals Y(t) (represented by data 1b, 2b, Nb), i.e.: $Y(t)=X(t)*C^{-1}$. Thus, signal processing unit 70 may be referred to as a N×N MIMO device.

In the embodiment shown in FIG. 4, wavelength selective element 60a, 60b, . . . , 60N and associated optical receivers 62a, 62b, 62N represent a demultiplexer 14 (FIG. 1) and signal processing unit 70 represents a calculator 16 (FIG. 1).

In embodiments of the invention, signal processing to compensate for interferences caused by crosstalk in WDM systems or predistortion takes place digitally. In alternative embodiments, the corresponding signal processing may take place in an analog manner.

Figure 5:
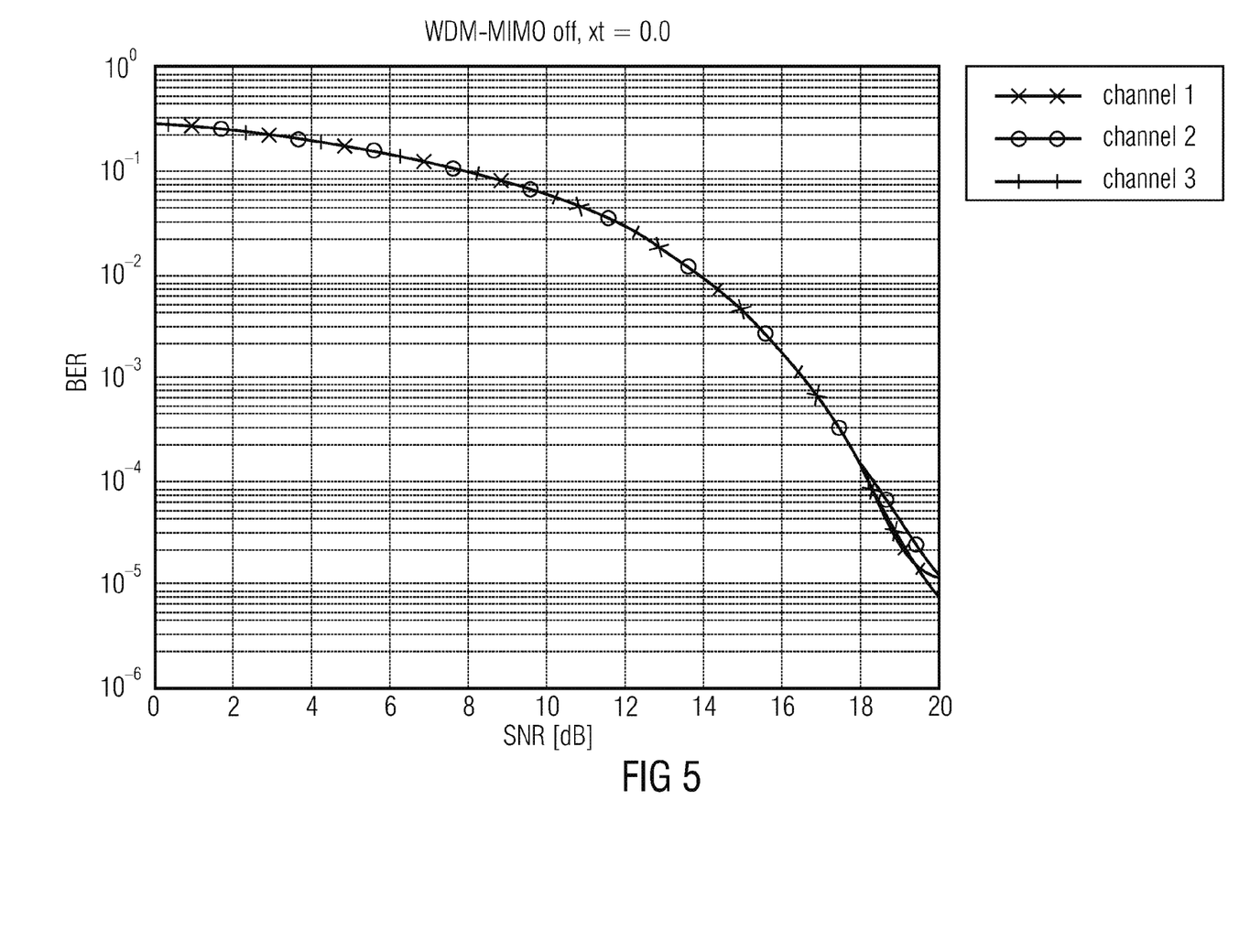
FIGS. 5,6a,6b,7a,7b show simulation results showing the advantages obtainable by embodiments of the invention.

Simulation results showing the effect of the inventive approach are now described referring to FIGS. 5 to 7b. To be more specific, simulation results for a three channel optical transmission system are explained. The wavelength of a first channel, channel1, was in a blue visible range, the wavelength of the second channel, channel2, was in a green visible range and the wavelength of the third channel, channel3, was in a red visible range. Discrete multi-tone modulation (DMT) with 256 subcarriers and QAM16 (quadrature amplitude modulation) was selected as a transmission format. Without any WDM crosstalk, the theoretically expected graph of the bit error rate (BER) over the signal-to-noise ratio for QAM16 is obtained as shown in FIG. 5. The indication xt=0,0 in FIG. 5 indicates that there is no crosstalk interference. The indication "WDM-MIMO off" indicates that no correction has been performed.

Figure 6A:
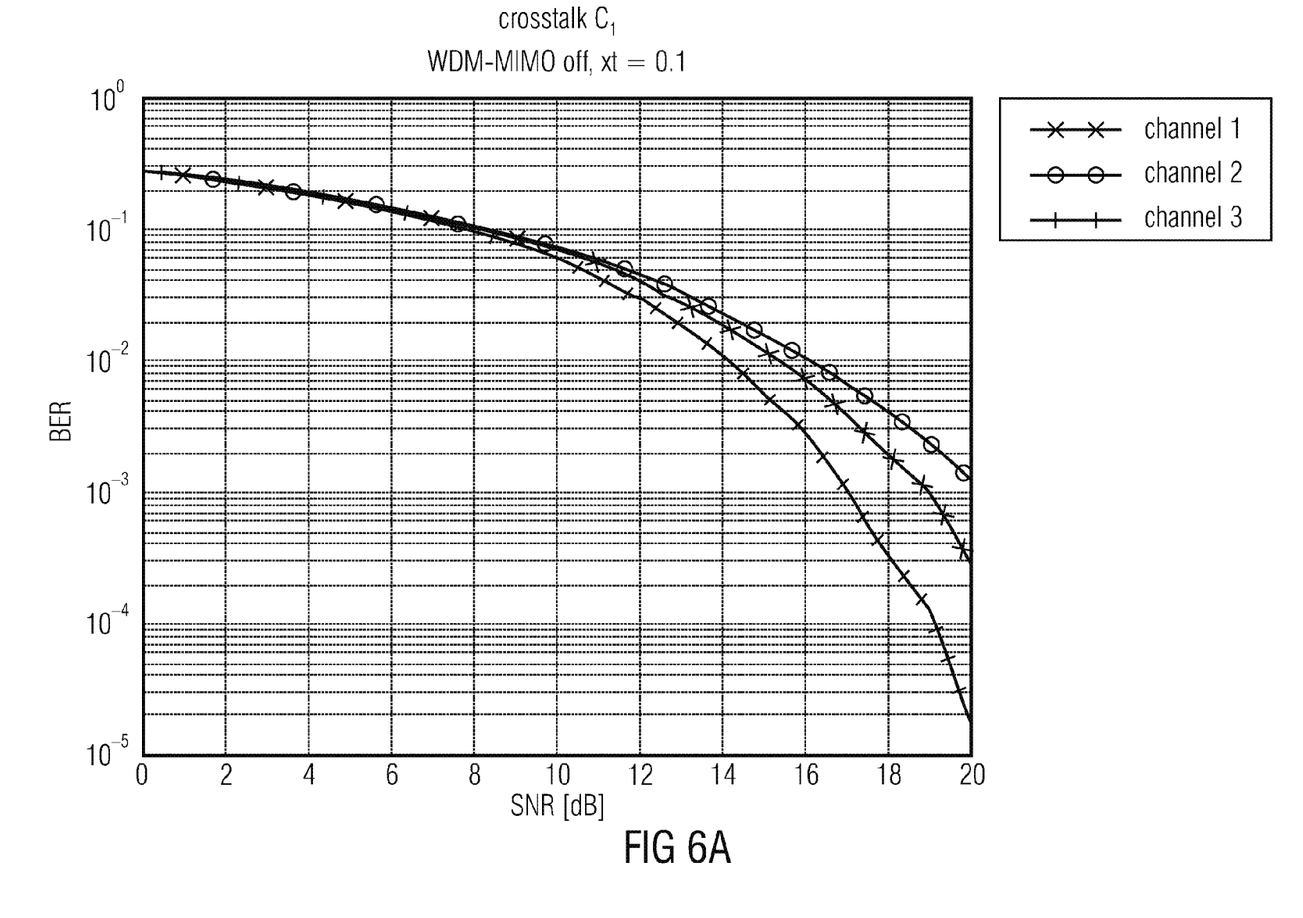
Figure 6B:
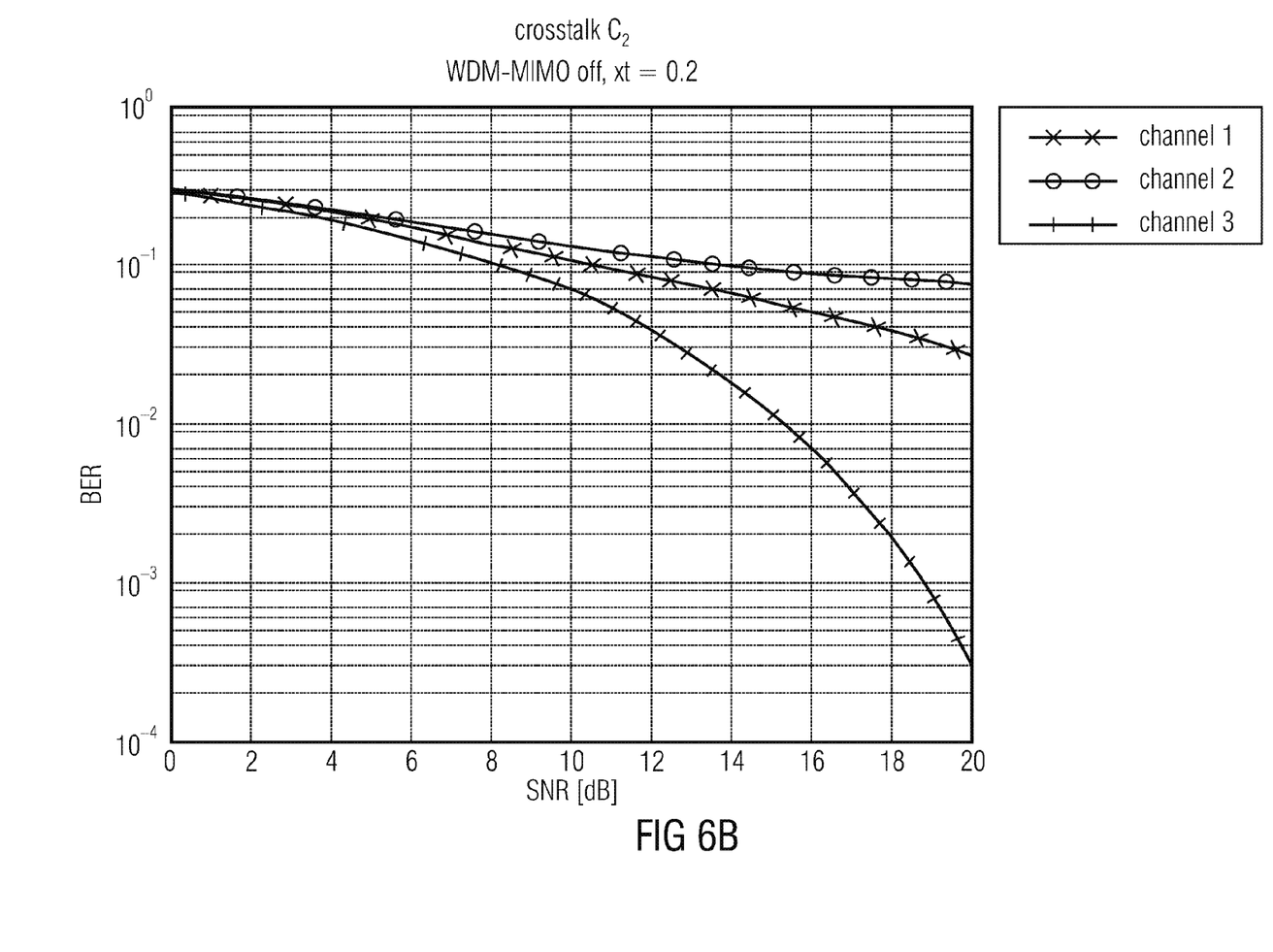

FIGS. 6e and 6b show the respective graphs for different interferences, wherein FIG. 6a shows that graph for a weaker interference xt=0,1 and FIG. 6b shows the graph for a stronger interference, xt=0,2. Crosstalk matrices $C_1$ and $C_2$ are associated with the interferences:

$$c_1 = \begin{pmatrix} 0.85 & 0.1 & 0 \\ 0.05 & 0.85 & 0.1 \\ 0 & 0.05 & 0.85 \end{pmatrix}$$

$$c_2 = \begin{pmatrix} 0.7 & 0.2 & 0 \\ 0.1 & 0.7 & 0.2 \\ 0 & 0.1 & 0.7 \end{pmatrix}$$

Without compensating for the interferences, the graphs shown in FIGS. 6a and 6b are obtained. One recognizes from FIGS. 6a and 6b that channel3 is disturbed most by WDM crosstalk. Thus, FIGS. 6a and 6b show that the central channel (channel 3) is disturbed most. Both outer channels are disturbed differently due to an unsymmetrical interference assumed.

Figure 7A:
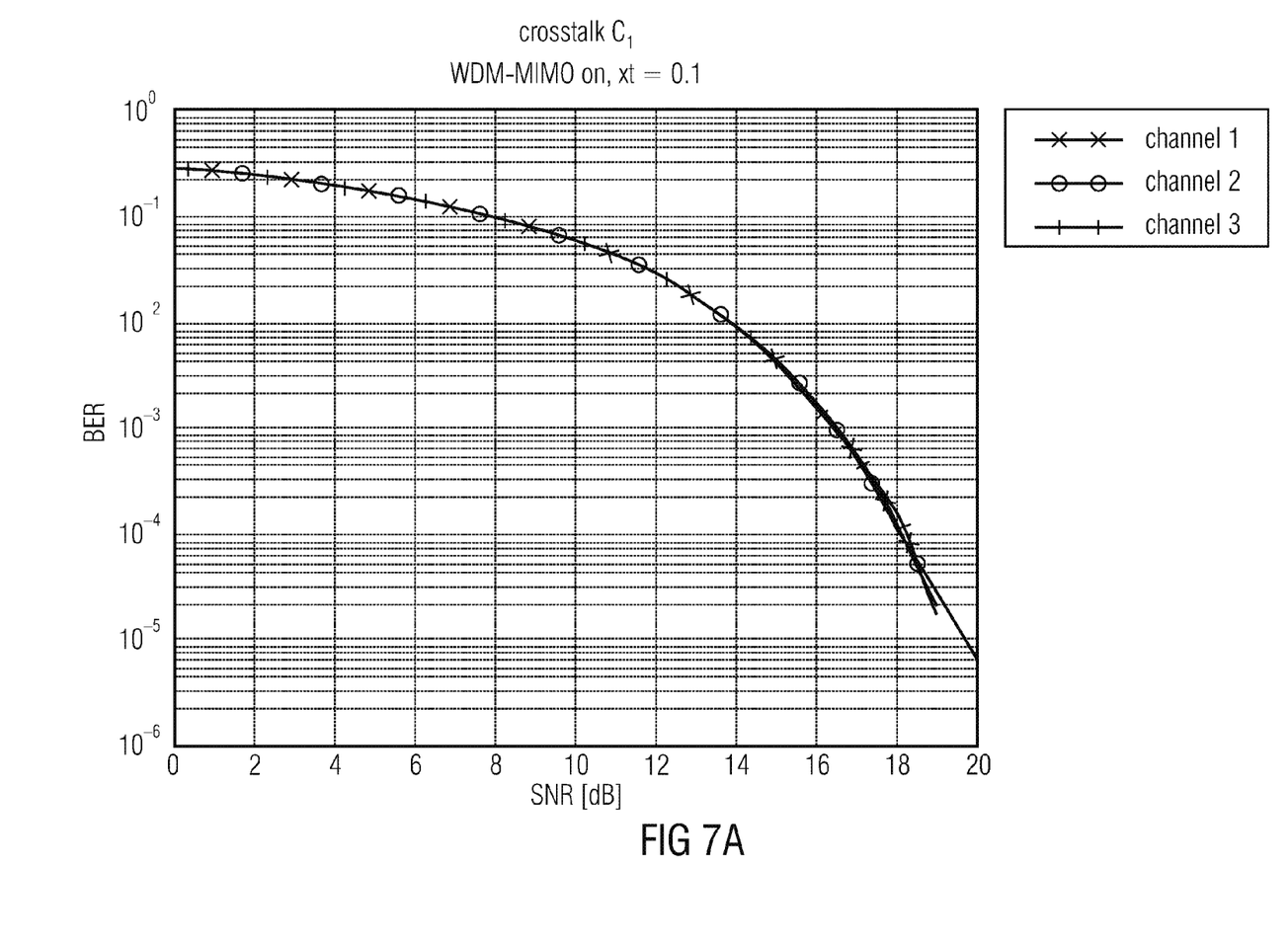
Figure 7B:
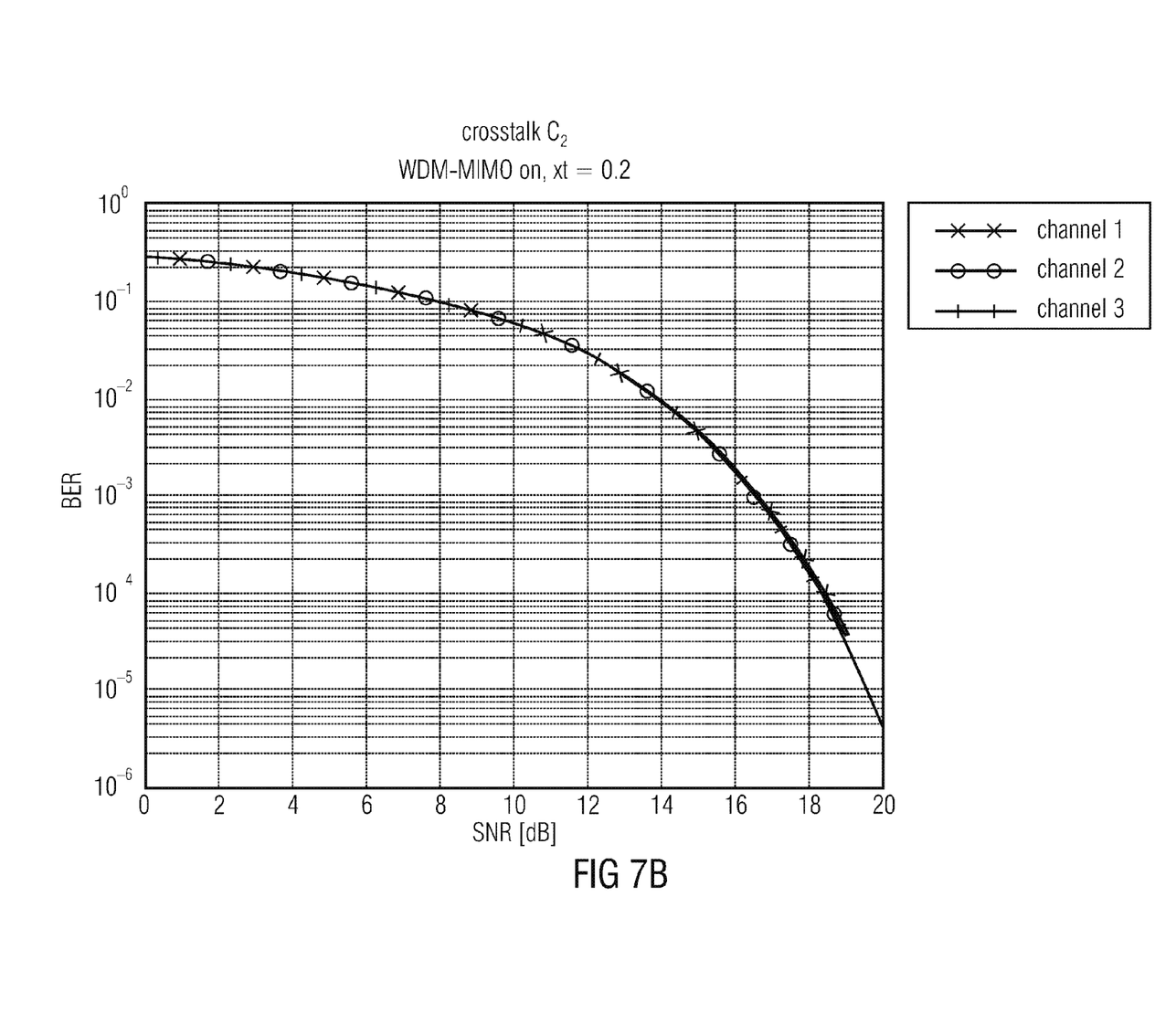

FIGS. 7a and 7b show graphs in case of interferences given by crosstalk matrices $C_1$ and $C_2$, wherein the described algorithm for compensating the WDM crosstalk interference is used. As can be derived from FIGS. 7a and 7b, the expected graph of the undisturbed case (FIG. 5) is achieved.

Accordingly, embodiments of the invention provide for an algorithm for correcting the distortions caused by WDM channel crosstalk in wireless or fiber optical transmission systems.

In embodiments of the invention, the wavelength selective elements, such as the optical filters or the arrayed waveguide gratings, need not to be arranged directly at the receiver side. Rather, the wavelength selective elements may be arranged somewhere in the transmission path, wherein an optical paths (such as fibers) may be provided between each of the wavelength selective elements and the associated receiver. For example, filters, such as arrayed waveguides, midway of the transmission path, i.e. at a distance from the receivers, may typically be used in fiber based transmission systems and color filtered signals are transmitted to the individual receivers.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a tangible machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for retrieving data from an optical wavelength-division multiplexing (WDM) signal received via a WDM path in a WDM transmission system comprising a plurality of channels associated with different wavelengths, comprising:
    a demultiplexer configured to split the optical WDM signal into a plurality of signals each associated with one of the channels;
    a calculator configured to calculate data associated with a respective one of the channels based on the signal associated with the respective channel and taking information on determined crosstalk interferences of other channels to the respective channel into consideration; and
    analog digital converters to convert the plurality of signals into digital signals,
    wherein the calculator is configured to multiply a receipt vector by an inverse of a crosstalk matrix, wherein each element of the receipt vector comprises the digital signal associated with one of the channels and wherein the crosstalk matrix identifies crosstalk interferences between the channels in the WDM transmission system.

2. The apparatus of claim 1, wherein the calculator is configured to take information on crosstalk interferences of only two direct neighbor channels of the respective channel into consideration.

3. The apparatus of claim 1, wherein the calculator is configured to take an information on a determined crosstalk interference of only two direct neighbor channels of the respective channel into consideration so that the crosstalk matrix is a tridiagonal crosstalk matrix.

4. The apparatus of claim 1, further comprising a channel estimator configured to determine crosstalk interferences between the channels based on predetermined and distinguishable sequences of symbols and to dynamically update the information on the determined crosstalk interferences.

5. A wavelength-division multiplexing system comprising an apparatus according to claim 1, a transmitter and a WDM path coupling the transmitter and the apparatus.

6. The wavelength-division multiplexing system of claim 5, wherein
    the transmitter is a transmitter for transmitting an optical wavelength-division multiplexing signal via a WDM path in a WDM transmission system comprising a plurality of channels associated with different wavelengths, the transmitter comprising a predistorter configured to predistort data associated with a respective one of the channels by information on determined crosstalk interferences of other channels to the respective channel, and a signal source for each channel of the WDM transmission system configured to convert the data associated with the respective channel into an optical signal comprising a carrier frequency corresponding to the wavelength of the respective channel and to apply the optical signal to the WDM path,
    the apparatus is a receiver configured to receive WDM signals from the transmitter through the WDM path and, to send the determined information on crosstalk interferences to the transmitter.

7. The WDM system of claim 5, wherein the WDM path comprises an optical fiber or a polymer optical fiber or wherein the WDM path is a wireless optical path.

8. A method for retrieving data from an optical wavelength-division multiplexing signal received via a WDM path in a wavelength-division multiplexing transmission system comprising a plurality of channels associated with different wavelengths, comprising:
- splitting the optical WDM signal into a plurality of signals each associated with one of the channels;
- calculating data associated with a respective one of the channels based on the signal associated with the respective channel and taking information on determined crosstalk interferences of other channels to the respective channel into consideration, and converting the plurality of signals into digital signals;
- wherein said calculating comprising multiplying a receipt vector by an inverse of a crosstalk matrix, wherein each element of the receipt vector comprises the digital signal associated with one of the channels and wherein the crosstalk matrix identifies crosstalk interferences between the channels in the WDM transmission system.

9. A non-transitory computer-readable medium having stored thereon a computer program comprising program code for performing a method according to claim 8 when the computer program runs on a computer.

* * * * *

UNITED STATES PATENT AND TRADEMARK OFFICE
CERTIFICATE OF CORRECTION

| | | |
|---|---|---|
| PATENT NO. | : 9,503,187 B2 | Page 1 of 1 |
| APPLICATION NO. | : 14/690246 | |
| DATED | : November 22, 2016 | |
| INVENTOR(S) | : Kai Habel et al. | |

It is certified that error appears in the above-identified patent and that said Letters Patent is hereby corrected as shown below:

On the Title Page

Item (72) Inventor:
"Kai HABEL, Guestrow, GERMANY"

Should read:
-- Kai HABEL, Gruenow, GERMANY --

Signed and Sealed this
Third Day of January, 2017

Michelle K. Lee
*Director of the United States Patent and Trademark Office*